US008195385B1

(12) United States Patent
Harrison, Jr. et al.

(10) Patent No.: US 8,195,385 B1
(45) Date of Patent: *Jun. 5, 2012

(54) NAVIGATION CONTROL SYSTEM

(76) Inventors: John H. Harrison, Jr., Plano, TX (US);
J. Howard Harrison, Mobridge, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/806,294

(22) Filed: Aug. 9, 2010

Related U.S. Application Data

(63) Continuation of application No. 11/134,042, filed on May 19, 2005, now Pat. No. 7,801,677.

(51) Int. Cl.
*G01C 21/00* (2006.01)
(52) U.S. Cl. ........ 701/209; 342/147; 342/357; 342/457; 342/386; 37/348; 340/988
(58) Field of Classification Search .................. 701/209; 342/147, 357, 457, 386; 37/348; 340/988
See application file for complete search history.

(56) References Cited

U.S. PATENT DOCUMENTS

| | | | | |
|---|---|---|---|---|
| 6,859,721 B1 * | 2/2005 | Runquist et al. | ............. | 701/200 |
| 6,931,319 B2 * | 8/2005 | Adachi | ......................... | 701/446 |
| 7,149,625 B2 * | 12/2006 | Mathews et al. | ............... | 701/209 |
| 7,634,452 B2 * | 12/2009 | Adachi et al. | ................... | 706/46 |

* cited by examiner

*Primary Examiner* — Tuan C. To

(57) ABSTRACT

A real-time path-directed controller is disclosed. The controller is extraordinarily well-suited for navigating a vehicle along a desired path across a field for agricultural applications.
The controller comprises several important assemblies. It comprises a position sensor which produces an object position signal to an object position signal conditioning module (which, in turn, produces a conditioned object position signal to a controller summer). The controller also comprises a heading conditioning module for receiving the object position signal and conditioning the object position signal to produce a conditioned heading signal to the controller summer. The controller also comprises a control apparatus sensor for producing a control apparatus signal to a control apparatus signal conditioning module (which, in turn, produces a conditioned control apparatus signal to the controller summer). The controller also comprises a control apparatus null position conditioning module for conditioning a distance-differentiated object position signal and conditioned control apparatus signal to produce a conditioned null position signal to the controller summer. Finally, the controller comprises a controller summer summing the conditioned object position signal, the conditioned heading signal, the conditioned control apparatus signal, and the conditioned null position signal to produce a controller summer signal to a controller summer conditioning module so as to produce a control apparatus control signal to a control apparatus controller so as to direct the control apparatus and thereby direct the object by feedback control along the desired path.

8 Claims, 8 Drawing Sheets

$$T(S) = \frac{Kp * Ks * Kg * Kv}{\sim^3 *(velocity) + S^2 *(Ks * Kg) + S*(Ks * Kg * Kv * Kh) + (Kp * Kv * Ks * Kg)}$$

NAVIGATION CONTROL SYSTEM

CROSS-REFERENCE TO RELATED APPLICATIONS

This application is a continuation application, and claims the benefit, and incorporates the entirety, of:

U.S. Non-Provisional application Ser. No. 11/134,042, filed May 19, 2005 now U.S. Pat. No. 7,801,677 (entitled "Navigation Control System"), which claims the benefit, and incorporates the entirety, of U.S. Non-Provisional application Ser. No. 10/697,671, filed Oct. 29, 2003 (entitled "Navigation Control System"), which has now been granted as U.S. Pat. No. 6,925,380, issued Aug. 2, 2005, and which claims the benefit, and incorporates the entirety, of U.S. Provisional Application No. 60/422,454, filed Oct. 30, 2002 (entitled "Navigation Control System").

BACKGROUND. OF THE INVENTION

Many applications today require the navigation of a vehicle along a desired path. These applications vary widely and involve vehicles suited for travel over land, sea or air.

In many cases, the navigation of a vehicle is accomplished in one of three major ways. First, the function may be performed by a human being skilled in the operation of the particular vehicle. With an understanding of the vehicle performance characteristics and navigational control apparatus, the operator navigates the vehicle along the desired path. An example of this "manual" mode of navigation is the farmer steering his tractor across a field.

A second major navigational system features the use of one or more automated systems to assist a human operator in navigating/steering the vehicle. In many of these systems, which are referenced in this disclosure as "assistive" systems, the system evaluates the position of the vehicle compared to the desired path and provides feedback to the human operator usually by means of some kind of visual display.

A third major navigational system allows an automated system to take complete (or near-complete) control over the task of navigating the vehicle. An example of this type of "automated" mode of navigation is the "autopilot" which is commonly employed in modern jet aircraft.

Each of these navigational systems feature certain advantages and disadvantages. Manual systems, which rely upon human operators for most of the navigational control function, are inherently simpler and less expensive to own and operate. However, human operators have limitations which may affect efficiency. For example, a human operator may find it relatively easy to steer a twenty-four-inch-wide lawn mower across his lawn. However, if given the opportunity, that same operator would likely discover how difficult it is to efficiently navigate a ninety-foot-wide fertilizer sprayer across a thousand-acre field which is free of helpful landmarks. In attempting this latter task, he will discover that he frequently "skips" some large swaths of land (resulting in localized under-treatment of crops) while "overlapping" others (resulting in localized over-treatment of crops).

Assistive systems can dramatically improve the efficiency with which the operator navigates his vehicle. However, they can also be quite burdensome. Simply put, the farmer piloting today's complex, instrument-laden tractors has multiple duties; he cannot focus one hundred percent of his time and attention upon steering alone. Similarly, he finds it tiring to utilize assistive technologies that demand that he spend an entire ten-hour day staring at a feedback display.

For these reasons and more, there is a great demand for automated navigational systems. These systems, properly designed, have the potential for increasing the efficiency with which a vehicle is navigated while simultaneously freeing the operator to focus upon other tasks. Furthermore, use of automated technologies, such as the one described here, in agricultural applications can yield a significant reduction in fertilizer and herbicide spray overlap which results in benefits to the soil, crops, and waterways that receive run-off from treated land. Overlap reduction also results in the conservation of energy resources. It is to these automated systems, and to more user-friendly assistive systems, that this disclosure has primarily been directed.

DETAILED DESCRIPTION

Overview of Navigation System Components

The automated navigation system described in this disclosure utilizes a global positioning system (GPS) receiver, controller, wheel actuator assembly, control wheel position sensor, and interconnecting cables/communication conduits. Additional embodiments may utilize additional or different sensors, e.g. inertial, optical, acoustic, magnetic, or gravity-biased sensors. Interfacing with these components, the controller incorporates unique control feedback methods that comprise the invention.

Navigation Along a Desired Path

Figure 1:
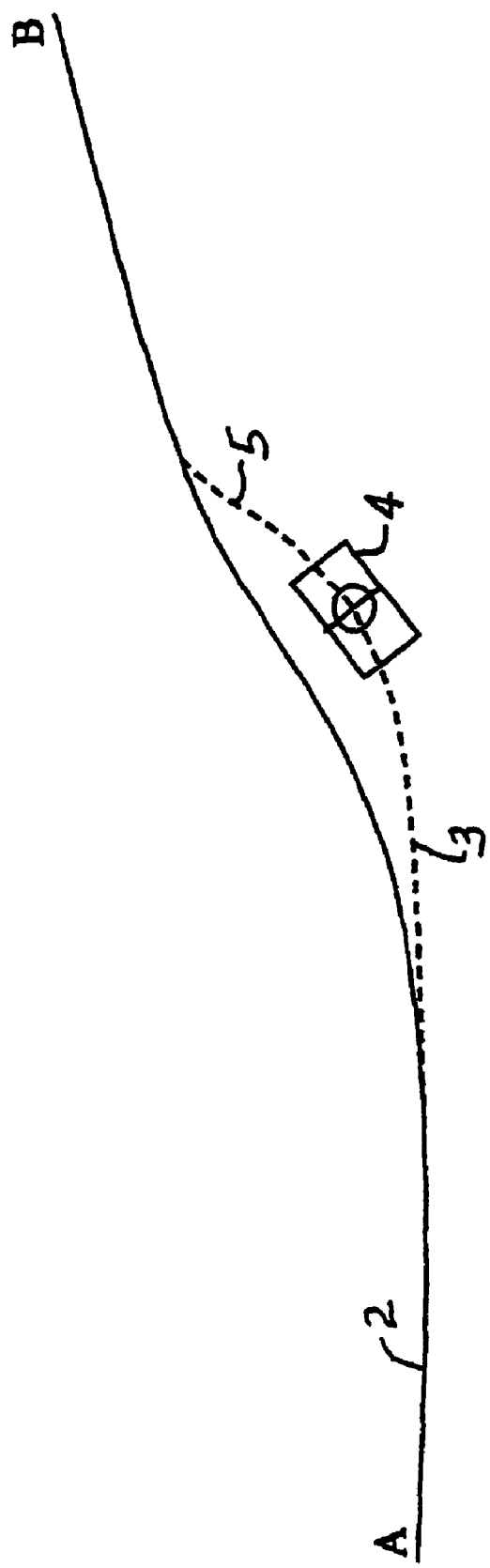
FIG. 1 depicts a desired path between two points.

FIG. 1 depicts a desired path 2 between points A and B in a field. While navigating across the field, the vehicle 4 will occasionally deviate from the desired path 2. This deviation is shown by the dotted path 3. It is desired to navigate the vehicle back to path 2. An example of a path that returns the vehicle to desired path 2 is shown by dotted path 5.

Desired path information can be obtained in a number of different ways, e.g. (a) downloaded to the controller from an external source or program; or (b) generated in the field by storing coordinate positions (e.g., GPS coordinate positions). Generation of coordinate positions in the field could be accomplished in several ways including (i) in real time while driving across the field (including along a curved path); (ii) for two distinct points in the field (thereby defining a path, e.g., a straight line, between the two points); or (iii) by means of a path generation program based upon a set of boundary points and conditions.

Figure 2:
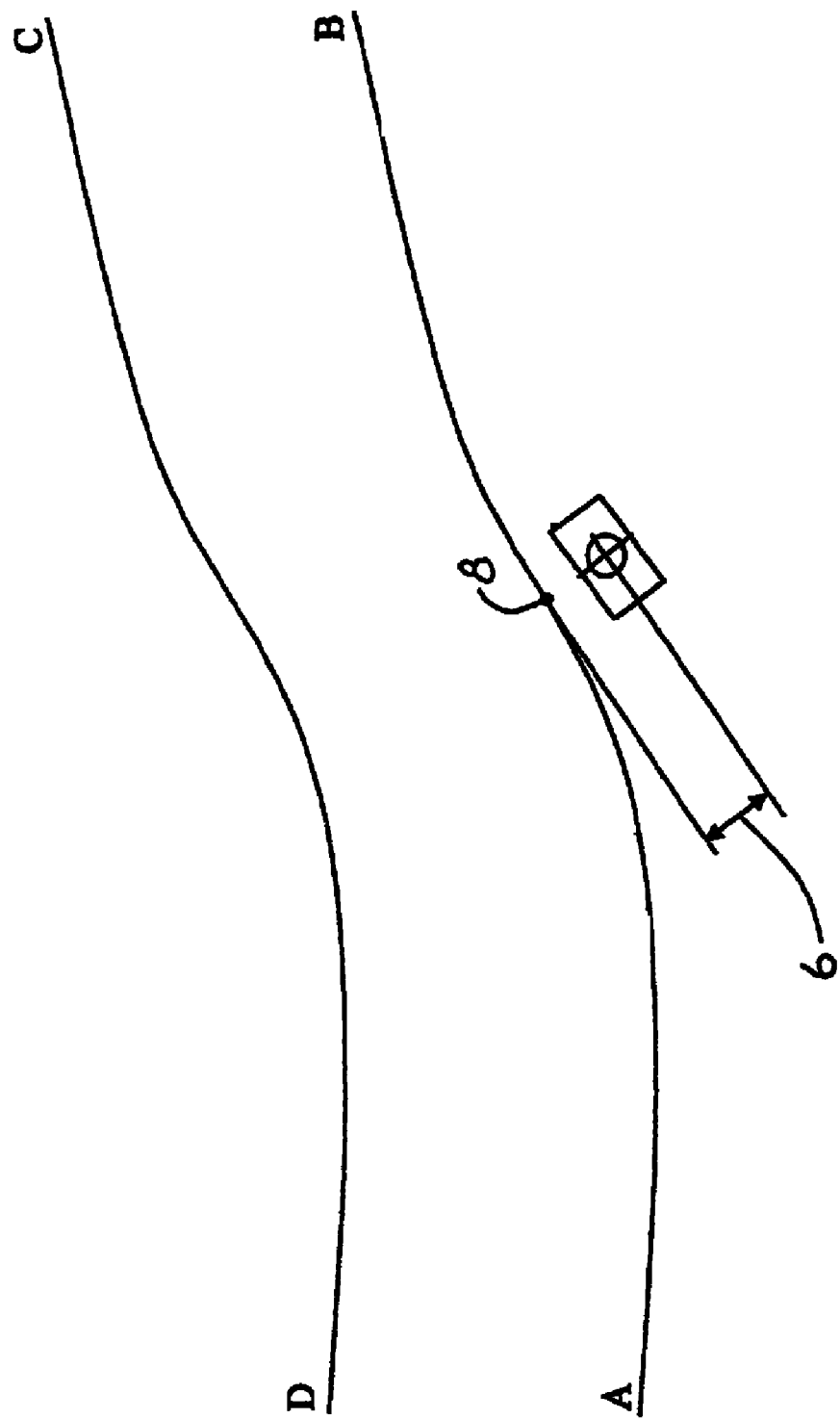
FIG. 2 depicts a desired path between two points and a second desired path offset from the first.

When generating path information in the field, it may be desired to generate the second and subsequent paths as an offset (for example, a ninety-foot offset) from the first path. Thus, referring to FIG. 2, after the vehicle has traveled from point A to point B on path A-B, it is desired to turn the vehicle around and navigate the vehicle from point C to point D along parallel curvilinear path C-D.

Components of a Novel Control Scheme

The novel control scheme described herein calculates a control signal that facilitates navigating a vehicle along a desired path. In order to clearly describe the system, it is useful to define a number of terms associated with both the vehicle and the control system that directs it.

The absolute location of a vehicle is referred to herein as its position. The distance from the path to the vehicle along a line perpendicular to the path and intersecting the vehicle is known as the position error. The point where this perpendicular line intersects the path is known as the control point. A position error distance 6 and control point 8 are depicted graphically at FIG. 2. The desired heading is the direction tangent to the path at the control point. The actual heading is the direction the vehicle is moving at its current position. The signed difference between the desired heading and the actual heading is known as the relative heading.

The manner in which a vehicle is navigated depends on the type of vehicle. A farmer steers or navigates his tractor by turning the steering wheel which, in turn, through a variety of mechanical and/or hydraulic linkages, turns one or more of the wheels on the tractor (these wheels hereinafter referred to as control wheel(s)) to effect a turn. Other types of vehicles may employ different control apparatuses to effect the turn: e.g., a rudder for watercraft and aircraft; differential drive rates as in a track type vehicle or some robots. In any case, the principle is the same.

Inputs to the Control System

In a typical application, the novel control system described herein sends control signals to the control wheel actuator so as to minimize/effectively eliminate the position error. It is a third order scheme with variable control parameters (e.g., Kp, Ks, and Kh) calculated in the distance domain rather than the time domain. Use of the distance domain, rather than the time domain, constitutes a unique approach to this particular class of control problem, and, although it introduces certain complications, it also yields superior results.

Required inputs to the control system include vehicle position; desired position; vehicle heading; desired heading; distance rate of change of the relative heading (dRHeading/dD); and vehicle velocity. Each of these inputs can be determined and communicated to the controller in a number of ways well known to persons of ordinary skill in the art.

One method of determining vehicle position is via GPS telemetry. Other methods may include optical or acoustical methods. The relative heading can be determined in a number of ways (e.g., spatial differentiation of the GPS telemetry; Doppler phase shift of the local GPS clock; or additional sensors). The distance rate of change of the relative heading can be calculated from the control wheel position and the vehicle turning radius. It can also be calculated in other ways utilizing additional sensors such as a gyro or compass. The velocity is readily available by spatial differentiation of the GPS telemetry or by external sensors.

The Control System

Figure 3:
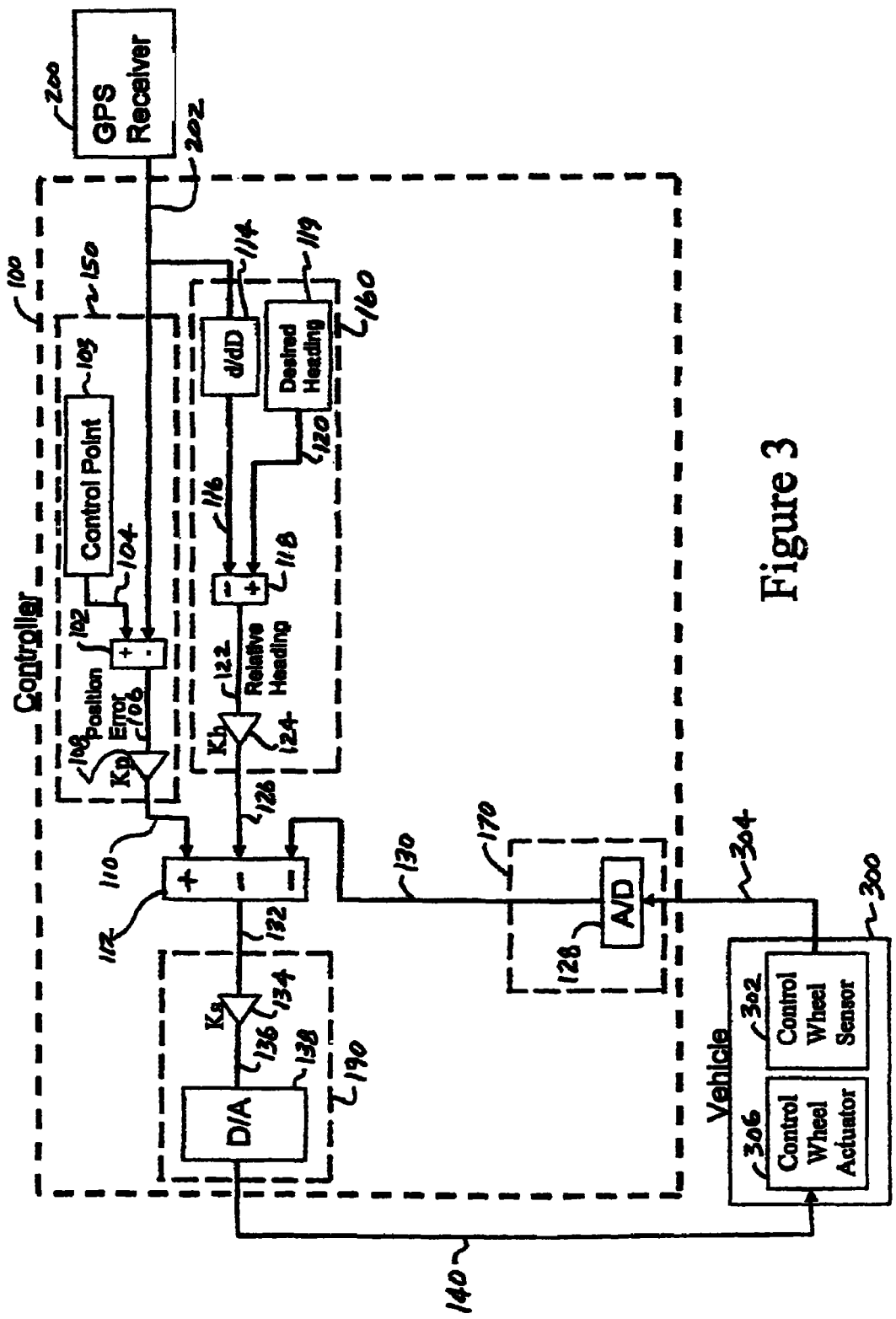
FIG. 3 depicts the instant inventive controller.

FIG. 3 constitutes a depiction of the elements of an embodiment of the control scheme. These elements may be reflected in physical components or in control software code.

As the vehicle navigates along a path, the GPS receiver 200 sends a data signal 202 specifying the vehicle position to summer 102. Summer 102 subtracts the vehicle position signal 202 from the control point signal 104 (signal 104 produced from control point generator 103) yielding the position error signal 106. Position error signal 106 enters multiplier 108 having a gain Kp; multiplier 108 produces signal 110. Signal 110 enters summer 112. Elements 102, 103, and 108 thus operate as a vehicle position signal conditioning module 150, producing a conditioned vehicle position signal 110 which is directed to the summer 112.

Data signal 202 is also directed to differentiator 114. Positional signal 202 is differentiated in the distance domain producing signal 116 which is thereupon directed to summer 118. Summer 118 sums signal 116 and desired heading signal 120 (signal 120 produced from desired heading generator 119) to yield relative heading signal 122. Signal 122 is routed to multiplier 124 having a gain of Kh yielding signal 126 which is directed to summer 112. Elements 114, 118, 119, and 124 thus operate as a heading conditioning module 160, producing a conditioned heading signal 126 which is directed to the summer 112.

Control wheel sensor 302 sends a signal 304 which represents control wheel position and which is proportional to the distance rate of change of the relative heading to an analog-to-digital converter 128 which produces signal 130 which is, in turn, directed to summer 112. As stated above, as an alternative, signal 304 could be obtained via a gyro or some other sensor. The mathematical equivalent of signal 304 in FIG. 3 is also represented, as discussed further below, as signal 712 in the mathematical model of the vehicle in FIG. 4B. Element 128 thus operates as a control apparatus signal conditioning module 170, producing a conditioned control apparatus signal 130 which is directed to the summer 112.

Although it would be apparent to one of ordinary skill in the art from this disclosure, if control wheel sensor 302 should actually generate a digital signal directly, then, of course, analog-to-digital converter 128 would be unnecessary, although there might still be a need to do some minor conditioning of the signal, through control apparatus signal conditioning module 170, to convert it to a form useable by summer 112. Similarly, if signal 136 should actually be an analog signal, or if it should be desired for signal 140 to be a digital signal for use by control wheel actuator 306, then, again, of course, digital-to-analog converter 138 would be unnecessary, although there might still be a need to do some minor conditioning of the signal, through summer conditioning module 190, to convert it to a form useable by control wheel actuator 306. Finally, it may also be possible to eliminate signal string 304-130 entirely if control wheel actuator 306 utilizes an internal control wheel sensor such that control wheel actuator 306 exhibits the same dynamic response as signal loop 304-130-132-136-140.

Summer 112 sums signals 110, 126 and 130 as shown to produce signal 132. Signal 132 is directed to multiplier 134 having a gain of Ks to produce signal 136. Signal 136 is directed to digital-to-analog converter 138 to produce actuating signal 140. Elements 134 and 138 thus operate as a summer conditioning module 190, producing a control apparatus control signal 140.

It is actuating signal 140 which is directed to the control wheel actuator 306 which turns the control wheel(s) which navigate/steer the vehicle. The movement of the vehicle is reflected in future GPS signals leaving the GPS receiver 200 (which, from a control standpoint, "closes the loop").

Tuning the Control System: a Useful Step-by-Step Process

In effectively implementing any control system, much of the scientist's work lies in analyzing the stability of the system (here the vehicle and the control system which directs its movement) and effectuating precautions to ensure system performance stability. Various system parameters (e.g., Ks, Kh, Kp and the "poles" discussed below) must be selected (i.e., "tuned") to ensure or enhance the stable operation of the system. This process is an integrative one that involves consideration of multiple factors. It is also an iterative process in which an initial set of parameters is chosen, performance is evaluated, and the parameters are revised as necessary to improve performance.

A useful procedure for the tuning of a control system such as the one described herein is as follows: (a) a mathematical dynamic model of the system being controlled (here, a specific, and unique, vehicle being steered/navigated) is developed; (b) a model transfer function is developed (from the dynamic model) which approximates the true dynamics of the system; (c) an initial set of poles associated with the model transfer function are chosen; (d) the gain constants associated with the dynamic model, the model transfer function, and the initial set of poles are calculated; and (e) the performance of the system based upon the actions taken in steps (a) through (d) is evaluated. Based upon the control engineer's appraisal of the system performance in step (e), the poles chosen in step (c) may need to be adjusted. A course of trial and error follows until the system performs as desired.

Desired system performance is not simply a matter of selecting poles and other parameters that mathematically minimize overshoot or positional error. On the contrary, the control engineer may recognize human or other factors that affect the selection of the poles and the gain constants associated therewith. However, the gain constants referenced in the control scheme (e.g., in FIGS. 3 and 5) are important determinants of macro system stability, and techniques useful for the selection of constants which provide generally stable control have been developed and are now described.

Step (a): Development of a Dynamic Model

The first step in the tuning sequence referenced above is step (a), the development of a mathematical dynamic model of the system being controlled (here; a specific, and unique, vehicle being steered/navigated).

Figures 4A, 4B:
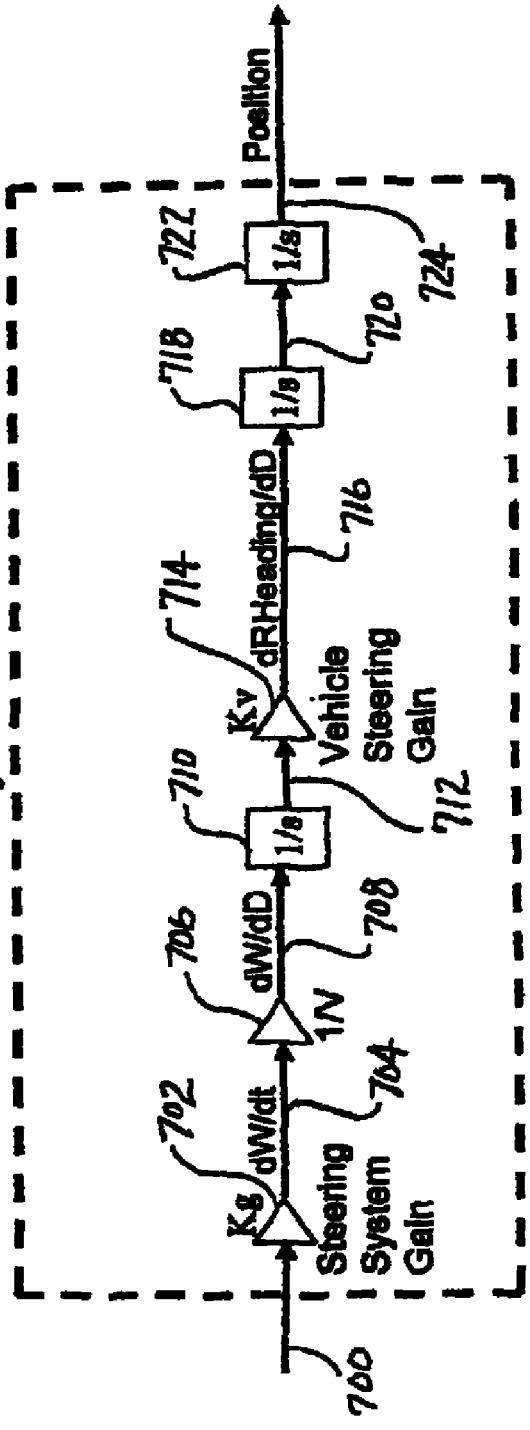
FIG. 4A depicts a transfer function.
FIG. 4B depicts a dynamic model.

A dynamic mathematical model which has proven itself useful and effective for agricultural vehicles (e.g., tractors, sprayers, harvesters) in particular, and which is believed to also be useful for a variety of land-based vehicles, appears in FIG. 4B. It is important to note that the dynamic model shown, as accurate and effective as it is, is still only a model of the vehicle's true dynamic performance. While it is possible to model the same physical vehicle in a multitude of different ways, the model shown in FIG. 4B has proven itself to be surprisingly effective.

In FIG. 4B, signal 700 enters multiplier 702 having a gain of Kg. Kg is the gain response of the electro-mechanical-hydraulic steering system. Thus, this dynamic model assumes a linear response of the control wheel actuator valve; if a non-linear valve is used, a compensatory technique should be used to linearize the valve's performance. Because the GPS receiver's signal may well contain noise, it may be possible to both linearize a non-linear valve and filter noise through the addition of a first-order filter to the input of the valve. Mathematically, Kg is proportional to the time rate of change of the steering wheel's angle at a given input. It produces signal 704, which represents the time rate of change of the control wheel's angular position. Signal 704, in turn, enters multiplier 706 having a gain 1/V (V=vehicle velocity) which transforms signal 704 from the time domain to the distance domain producing signal 708.

Signal 708 enters integrator 710 producing signal 712 which represents the position of the control wheel(s) and is proportional to the distance rate of change of the relative heading. The actual control wheel position can be measured and transmitted to the controller as shown in FIG. 3 at sensor 302 and signal 304. Signal 712 enters multiplier 714 having a gain Kv to produce signal 716. Gain Kv is the vehicle taming gain commonly referred to as the turning radius of the vehicle. Mathematically, Kv is proportional to the inverse of the turning radius at a given control wheel(s) position. Signal 716 is directed to integrator 718 producing signal 720. Signal 720 represents the heading of the vehicle. Finally, signal 720 is directed to integrator 722 producing signal 724 which represents the position of the vehicle.

Signal 700, the input to the dynamic model for the vehicle, is analogous to signal 140 in the embodiment shown in FIG. 3 and signal 440 in the embodiment shown in FIG. 5 (the latter embodiment discussed below). Signal 724, the output of the dynamic model for the vehicle, mathematically "returns" to the GPS receiver 200 in FIG. 3 and GPS receiver 500 in FIG. 5. The vehicle dynamic model described above may thus be referenced as a linear multiplicative-integrative vehicle dynamic model.

Step (b): Development of a Model Transfer Function

The second step, step (b), is the development of a model transfer function (based upon the dynamic model) which approximates the true dynamics of the system.

The transfer function associated with the FIG. 4B dynamic model for the vehicle and the control scheme depicted in FIG. 3 is shown in FIG. 4A. This FIG. 4A transfer function also serves as a useful practical approximation for the control scheme in FIG. 5. The mathematical methods of deriving transfer functions, such as the one shown in FIG. 4A, are well known to persons of ordinary skill in the art.

The FIG. 4A transfer function for the depicted control scheme is shown below and is valid for any method of obtaining the required inputs:

$$T(S) = \frac{Kp * Ks * Kg * Kv}{S^3 * (\text{velocity}) + S^2 * (Ks * Kg) + S * (Ks * Kg * Kv * Kh) + (Kp * Kv * Ks * Kg)}$$

In this function, the gain constants Kg and Kv are physically measured constants, as described above, which reflect the physical characteristics of the vehicle. As such, these constants are not time or position dependent and do not change during operation of the vehicle. It is important to note that the controller gain constants Ks, Kp, and Kh are dependent upon the chosen pole positions (described below) and the velocity of the vehicle.

Finally, it is important to note that the dynamic model of the vehicle and its associated model transfer function, when utilized with the control scheme described herein, are believed to be particularly effective for agricultural applications, in particular the problem of steering a sprayer at speeds as high as ten to twenty miles per hour and perhaps higher, while demonstrating stable and accurate control. The control scheme, the dynamic model, and the associated transfer function are all inter-related and, as is commonly the case, are the result of field testing.

Step (c): Selection of Poles

In the third step, step (c), an initial set of poles (roots of the characteristic equation) associated with the model transfer function is selected. The order of the control scheme determines the number of poles that must be selected. First order control schemes have one pole. Second order control schemes have two poles. Third order control schemes have three poles. Since this is a third order control scheme, there are three poles that must be selected.

In mathematical terms, each pole resides in the complex plane and must be defined using either rectangular or polar coordinates. Polar coordinates are used here. The "X" axis in the complex plane is the "real" axis. The "Y" axis in the complex plane is the "imaginary" axis. Using polar coordinates, each pole can be defined using two terms: an angle and a length. In general terms, the angle corresponds to the controlled overshoot of the system and the length corresponds to the speed of response.

Depending on the desired response of the control system (e.g., over damped, critically damped, or under damped), certain fundamental constraints apply to the selection of pole locations on the complex plane. For example, in over damped systems, all three of the poles lie on the real axis on the complex plane. In critically damped systems, all three poles lie on the real axis however at least two poles must have equal value. In under damped systems, one pole must lie on the real axis and the other two poles are complex conjugates, meaning that they have equal and opposite imaginary components as well as equal real components.

After selection of the desired response (e.g., over damped, critically damped, or under damped) for the control system, then appropriate pole values may be selected in accordance with the above.

Although there may be applications that are optimized with critically damped or over-damped response systems, it has been found that the application of this control system to farm vehicle navigation can be well-served utilizing under-damped control.

Although there are an infinite number of choices for the initial pole values for under-damped systems, it has been determined that choosing pole values near plus and minus forty five degrees (as measured from the real axis on the complex plane) is a good starting point for the two poles with imaginary components. The length of these two complex conjugate poles is unique to each vehicle; however, it is believed that, for many typical commercial farm vehicles utilizing commercially available high-quality GPS receivers, a value of 0.02 ft$^{-2}$ is a good initial value. Recall that the third pole must lie on the real axis but its length must be chosen. It has been determined that 0.02 ft$^{-1}$ is also a good initial value for the length of this third pole.

Step (d): Calculation of Gain Constants

The fourth step, step (d), is the selection of the gain constants associated with the dynamic model, the model transfer function, and the initial set of poles.

As discussed above, the constants Kg and Kv are based on the actual vehicle and do not change during operation. It should be noted that each unique vehicle utilizing this control scheme will require unique values for Kg and Kv.

The values Ks, Kp, and Kh are velocity dependant constants and change with vehicle speed. Theoretically these values should be recalculated at any incremental velocity change; however, it has been discovered that updating these values at one mile-per-hour increments is more than adequate for typical commercial applications.

To solve for the gain constants Ks, Kp, and Kh, the denominator of the transfer function (the characteristic equation) is set equal to zero and solved using methods well-known to persons of ordinary skill in the art.

Step (e): Appraisal of System Performance

Finally, in step (e), the performance of the system based upon the actions taken in steps (a) through (d) is evaluated. Based upon the control engineer's appraisal of the system performance in step (e), the poles chosen in step (c) may need to be adjusted. A course of trial and error follows, repeating steps (c) through (e), until the system performs as desired.

Minimizing "Drift"

The control system depicted in FIG. 3, and tuned in accordance with the dynamic model (FIG. 4B) and associated transfer function (FIG. 4A), exhibits excellent control characteristics. However, it may "drift" under some conditions. This drift, or systemic erroneous offset, can be caused by any number of factors, including increased drag on one side of the vehicle due to moisture in soil, wind, and/or mechanical drag, and is usually related to uncertainties associated with the null position of the control wheel(s). The null position of the control wheel(s) is the position which causes the change in the actual heading to be zero.

An augmented control scheme may be employed, when it is desired to reduce the drift associated with control wheel null position uncertainties, by the addition of a "steering drift compensator module" to the control scheme depicted in FIG. 3. This augmented scheme, which features steering drift compensator module 480, is depicted in FIG. 5. The drift compensator module 480, as indicated, features gain constants Ki and Km which are unique to the vehicle, steering system, sensors, and desired response.

Figure 5:
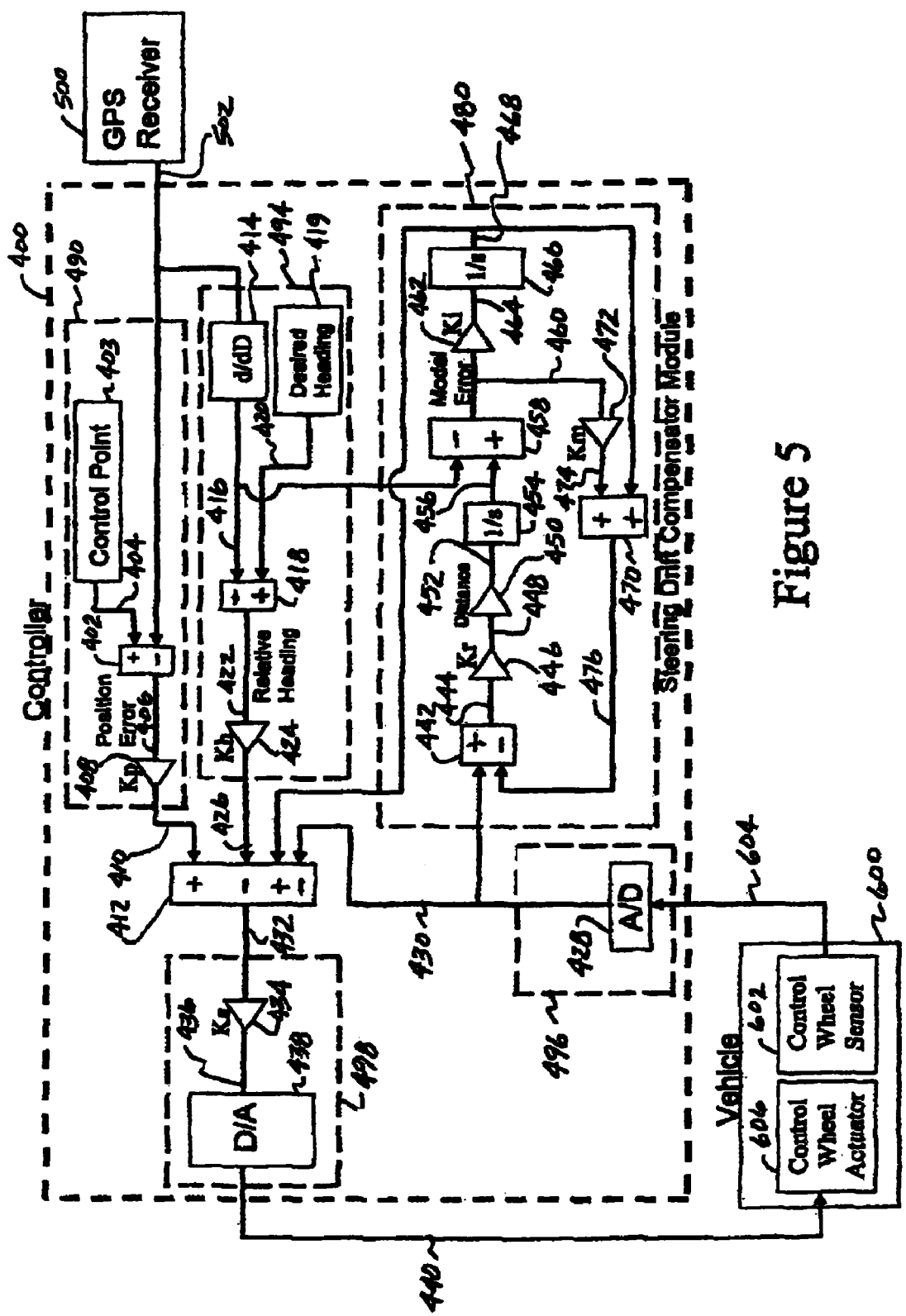
FIG. 5 depicts an alternative embodiment of the instant inventive controller.

FIG. 5 constitutes a depiction of the elements of an embodiment of the control scheme. These elements may be reflected in physical components or in control software code.

As the vehicle navigates along a path, the GPS receiver 500 sends a data signal 502 specifying the vehicle position to summer 402. Summer 402 subtracts the vehicle position signal 502 from the control point signal 404 (signal 404 produced from control point generator 403) yielding the position error signal 406. Position error signal 406 enters multiplier 408 having a gain Kp; multiplier 408 produces signal 410. Signal 410 enters summer 412. Elements 402, 403, and 408 thus operate as a vehicle position signal conditioning module 490, producing a conditioned vehicle position signal 410 which is directed to the summer 412.

Data signal 502 is also directed to differentiator 414. Positional signal 502 is differentiated in the distance domain producing signal 416 which is thereupon directed to summer 418. Summer 418 sums signal 416 and desired heading signal 420 (signal 420 produced from desired heading generator 419) to yield relative heading signal 422. Signal 422 is routed to multiplier 424 having a gain of Kh yielding signal 426 which is directed to summer 412. Elements 414, 418, 419, and 424 thus operate as a heading conditioning module 494, producing a conditioned heading signal 426 which is directed to the summer 412.

Control wheel sensor 602 sends a signal 604 which represents control wheel position and which is proportional to the distance rate of change of the relative heading to an analog-to-digital converter 428 which produces signal 430 which is, in turn, directed to summer 412. As stated above, as an alternative, signal 604 could be obtained via a gyro or some other sensor. The mathematical equivalent of signal 604 in FIG. 5 is also represented as signal 712 in the mathematical model of the vehicle in FIG. 4B. Element 428 thus operates as a control apparatus signal conditioning module 496, producing a conditioned control apparatus signal 430 which is directed to summer 412.

Signal 430 (analogous to signal 130 of FIG. 3), which is proportional to the distance rate of change of the relative heading, is directed to summer 442 of drift compensator module 480. Summer 442 produces signal 444. Signal 444 is directed to multiplier 446 having a gain Kr yielding signal 448. Signal 448 is in turn directed to multiplier 450 having gain "Distance" to yield signal 452. Signal 452 enters integrator 454 producing signal 456 which represents the predicted vehicle heading. Signal 448's path through multiplier 450 and integrator 454 transforms a time domain integration into the distance domain. Signal 456 and signal 416 enter summer 458, are summed, and produce the model error of the vehicle heading 460.

Signal 460 enters multiplier 462 having gain Ki which produces signal 464. Signal 464 enters integrator 466 producing signal 468. It is believed that integration at integrator 466 can be implemented in either the time domain or the distance domain with acceptable results. Signal 468 is directed to summer 470.

Signal 460, referenced above, is also directed to multiplier 472 having gain Km which produces signal 474. Signal 474 is directed to summer 470.

Summer 470 sums signal 468 and signal 474 to produce signal 476. Signal 476 is, in turn, directed to summer 442. Summer 442, as indicated above, produces signal 444; signal 444 is produced by summing signal 430 and signal 476.

Signal 468, referenced above, is also directed to summer 412. Signal 468 represents the actual control wheel(s)' null position. As indicated in FIG. 5, signal 468 is the output of the steering drift compensator module 480, a module whose inputs are signal 430 and signal 416. Thus, elements 442, 446, 450, 454, 458, 462, 466, 472, and 470 operate as a control apparatus null position conditioning module 480 (also know as a steering drift compensator module 480), conditioning a distance-differentiated vehicle position signal 416 and conditioned control apparatus signal 430 to produce a conditioned null position signal 468 which is directed to summer 412.

The steering drift compensator module 480 depicted is a second order system with configurable parameters Ki (associated with multiplier 462) and Km (associated with multiplier 472). Gain Kr (associated with multiplier 446) is mathematically equivalent to the measured Steering Gain Kv (associated with multiplier 714 in FIG. 4B).

Although it would be apparent to one of ordinary skill in the art from this disclosure, if control wheel sensor 602 should actually generate a digital signal directly, then, of course, analog-to-digital converter 428 would be unnecessary, although there might still be a need to do some minor conditioning of the signal, through control apparatus signal conditioning module 496, to convert it to a form useable by summer 412. Similarly, if signal 436 should actually be an analog signal, or if it should be desired for signal 440 to be a digital signal for use by control wheel actuator 606, then, again, of course, digital-to-analog converter 438 would be unnecessary, although there might still be a need to do some minor conditioning of the signal, through summer conditioning module 498, to convert it to a form useable by control wheel actuator 606. Finally, it may also be possible to eliminate signal string 604-430 entirely if control wheel actuator 606 utilizes an internal control wheel sensor such that control wheel actuator 606 exhibits the same dynamic response as signal loop 604-430-432-436-440 (although, in such a case, due to the absence of signal 430, signal 440 would also need to be conditioned and directed to summer 442 of steering drift compensator module 480).

Summer 412 sums signals 410, 426, 430, and 468 as shown to produce signal 432. Signal 432 is directed to multiplier 434 having a gain of Ks to produce signal 436. Signal 436 is directed to digital-to-analog converter 438 to produce actuating signal 440. Elements 434 and 438 thus operate as a summer conditioning module 498, producing a control apparatus control signal 440.

It is actuating signal 440 which is directed to the control wheel actuator 606 which turns the control wheel(s) which navigate/steer the vehicle. The movement of the vehicle is reflected in future GPS signals leaving the GPS receiver 500 (which, from a control standpoint, "closes the loop").

One final comment regarding the steering drift compensator module 480, and its tuning in relation to the control scheme as a whole, is in order. The control scheme in FIG. 5 may be tuned using the techniques herein described (i.e., development of a dynamic model, development of a model transfer function, selection of poles, etc.). However, if that technique is applied to the control system of FIG. 5, the control tuning process is applied to a system featuring numerous poles. However, alternatively, effective tuning can also be effectuated by tuning the drift compensator module 480 independently of the control system 400 as a whole.

The independent tuning of compensator module 480 is accomplished as follows. Compensator module 480, as referenced above, is a second-order system, and, as such, features two poles which will dictate the values of Ki and Km. Thus, in order to tune module 480, one selects an initial set of poles, calculates Ki and Krn, and appraises module 480 performance. Although this is inherently a trial-and-error process, well-known to control engineers, use of critical damping conditions in the selection of poles has been found to result in useful values of Ki and Km. In selecting a useful initial estimate for the length parameter associated with the selection of poles, it has been found that the same length employed in the FIG. 3 control scheme (i.e., the control scheme without the drift compensator module), or a length approximately equal thereto, is useful to initiate the trial-and-error process. Not uncommonly, the control engineer will be able to ascertain that the compensator module 480 has been effectually tuned when the output signal 468 approaches a DC characteristic.

Multi-Mode Operation

Although the control system described herein is extremely effective in steering the vehicle along a desired path, it has also been discovered that, during the auto-navigation of the vehicle across a large area, it may be desirable to alter the response of the control system depending on various conditions. Thus, rather than employing a single set of poles to govern the control system as it traverses the desired path, it is possible to employ multiple sets of poles, or multiple modes of operation, to govern the control system's performance. The overall response of the control system, and thus the path of the vehicle, is further improved by the use of such a "multi-mode" manner of operation.

As stated, the key difference between the various modes of operation lies in their use of different sets of poles. These selected sets of poles determine the controlled overshoot and the speed of response of the system in a particular mode of operation. An example of such a "multi-mode" mode of operation, which has proven itself useful in agricultural applications (i.e., a sprayer applying a herbicide to a field), follows.

Figure 6:
FIG. 6 depicts a desired path between two points and a second desired path offset from the first and a third desired path offset from the second.

With reference to FIG. 6, as the vehicle navigates across the field along path A-B, a unique set of poles may be selected for this "ordinary course" condition or mode of operation. The set of poles used under this mode (i.e., "Mode A") are selected to minimize error and maximize operator comfort at vehicle positions very near the desired path (e.g., less than or equal to one foot).

Once the vehicle reaches point B of FIG. 6, a u-turn is required to align the vehicle with path C-D. In such a circumstance, the operator will usually reduce vehicle speed for the u-turn. Thus, the set of poles used under this "u-turn" mode (i.e., "Mode B") might well be selected so as to accelerate the vehicle's approach to the new path C-D while the vehicle operates at a slower speed and at a position further from the desired path (e.g., greater than one foot). Once the vehicle's position is within one foot of the desired path, the system would automatically return to a Mode A mode of operation.

As the vehicle travels along path C-D, operating in Mode A, if it should encounter an ad hoc disturbance (e.g., a surface irregularity) which results in an unexpected and large displacement of the vehicle from the desired path, then use of a third mode (i.e., "Mode C") could be employed to rapidly return the vehicle to the desired path. Mode C might be utilized when the vehicle is traveling at normal speed and is located at positions greater than one foot from the desired path. The Mode C set of poles, compared to Mode A, reduces vehicle position error at a faster rate. Once the vehicle's position is within one foot of the desired path, the system would automatically return to a Mode A mode of operation.

The three example modes of operation described are summarized in the table below:

Example

| Modes A, B, and C are | Position Error | |
|---|---|---|
| dependent on vehicle position error and velocity | Less than or equal to 1 foot | Greater than 1 foot |
| Velocity Less than or equal to 11 miles per hour | Mode A (Use pole set 1) | Mode B (Use pole set 2) |
| Greater than 11 miles per hour | Mode A (Use pole set 1) | Mode C (Use pole set 3) |

As indicated, in this example, velocity and position error are the criteria for determining the system mode and the corresponding set of poles (i.e., pole set one, pole set two, or pole set three) to use. The selection of the poles in a pole set is determined in accordance with the tuning recommendations provided above. The Mode B pole set, as compared with the Mode A pole set, features a greater speed of response with minimal attention to overshoot considerations. The Mode C pole set, as compared with the Mode B pole set, features a moderated speed of response with greater attention to controlling overshoot.

Although it would be apparent to one of ordinary skill in the art from this disclosure, just as the operational modes of control may be made dependent on both the velocity and position error, as described in the example above, the mode of control might also be dependent upon either one of these alone (e.g., mode determined based upon velocity alone). Furthermore, it might also be desirable, in a particular case, to make the mode dependent upon other operational variables, such as time (so that, e.g., a particular set of poles would be utilized during the first ten seconds after the control system is engaged).

As stated, the three-mode example provided herein is just that—an example. Any number of modes may be utilized by the system designer to tailor the system's performance in the face of varying conditions. However, the example shown above provides useful guidance regarding the considerations that must be taken into account in order to establish robust control.

Eliminating Non-Linearities and Noise

In the section entitled "Tuning the control system: a useful step-by-step process," and, specifically, in the subsection entitled "Step (a): Development of a dynamic model," in the discussion regarding FIG. 4B, it was observed that the dynamic model assumes a linear response of the control wheel actuator valve, and, if a non-linear valve is used, a compensatory technique should be used to linearize the valve's performance. Because the GPS receiver's signal may well contain noise, it may also be possible to both linearize a non-linear valve and filter noise through the addition of a first-order, or higher order, filter to the input of the control wheel actuator.

Figure 7:
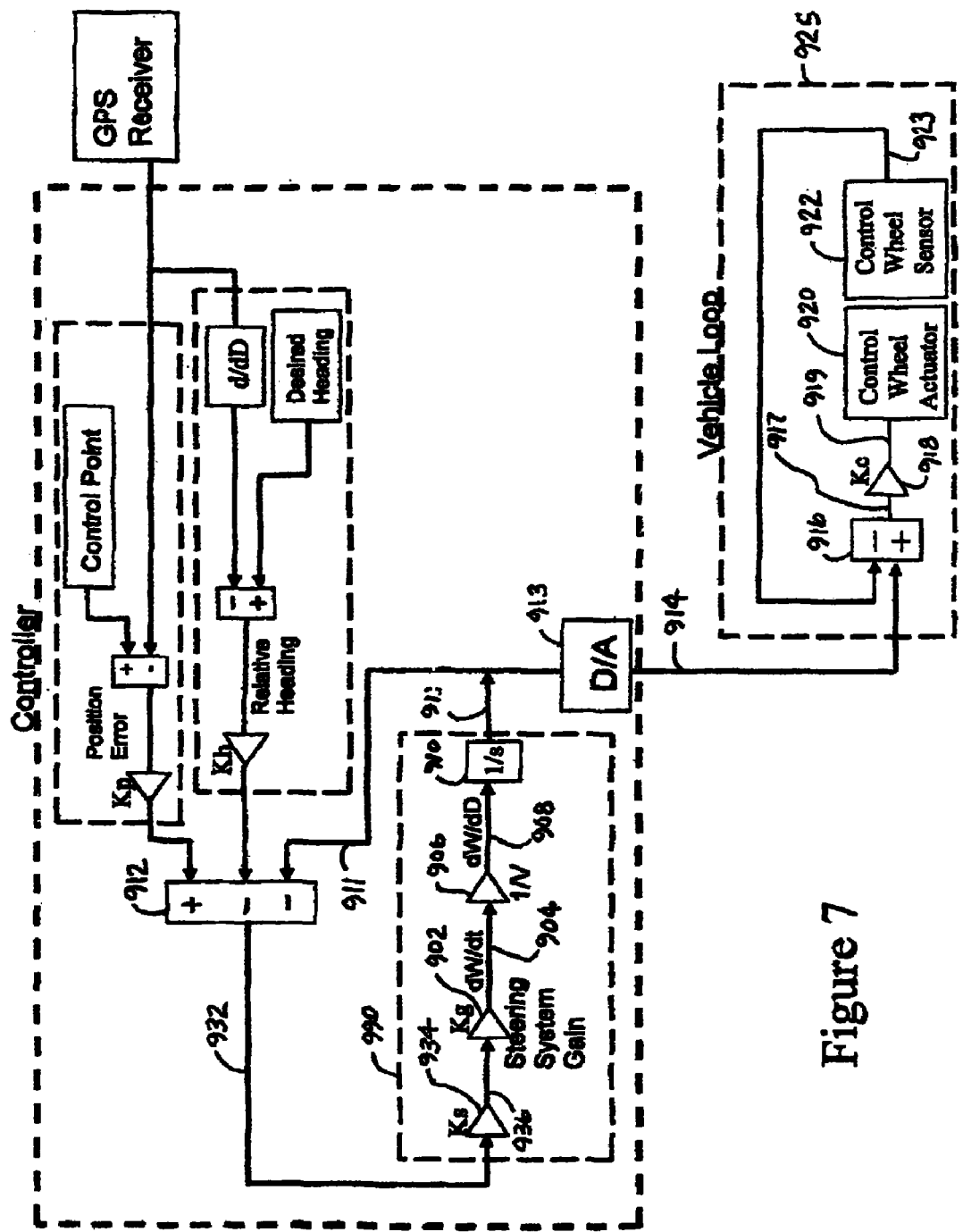
FIG. 7 depicts an embodiment which manages valve non-linearities and noise.

A useful technique for accomplishing this is depicted in FIG. 7. The vehicle dynamic model, in FIG. 4B, is used to implement a software representation of the vehicle steering mechanism. Items 702, 704, 706, 708, 710, and 712 from FIG. 4B are implemented in the controller as items 902, 904, 906, 908, 910, and 911 in FIG. 7, with signal 911 being analogous to signal 130 in FIG. 3.

The output signal 932 from the summer 912 in FIG. 7 is now directed to conditioning module 990. This module will have a linear response and is tuned in the same manner as described throughout this specification. The output signal 911 will now have the dynamics associated with a linear control wheel actuator. This signal 911 is sent to a hardware control loop (an example is shown in item 925 of FIG. 7) that contains the non-linear control wheel actuator 920.

While this hardware control loop can be implemented in a number of configurations, FIG. 7 depicts a first order proportional control compensator. Control theory suggests that this loop, regardless of embodiment, should be tuned such that the lowest frequency pole is on the order of four to five times more responsive than the loop created by items 912, 932, 990, and 911.

Figure 8:
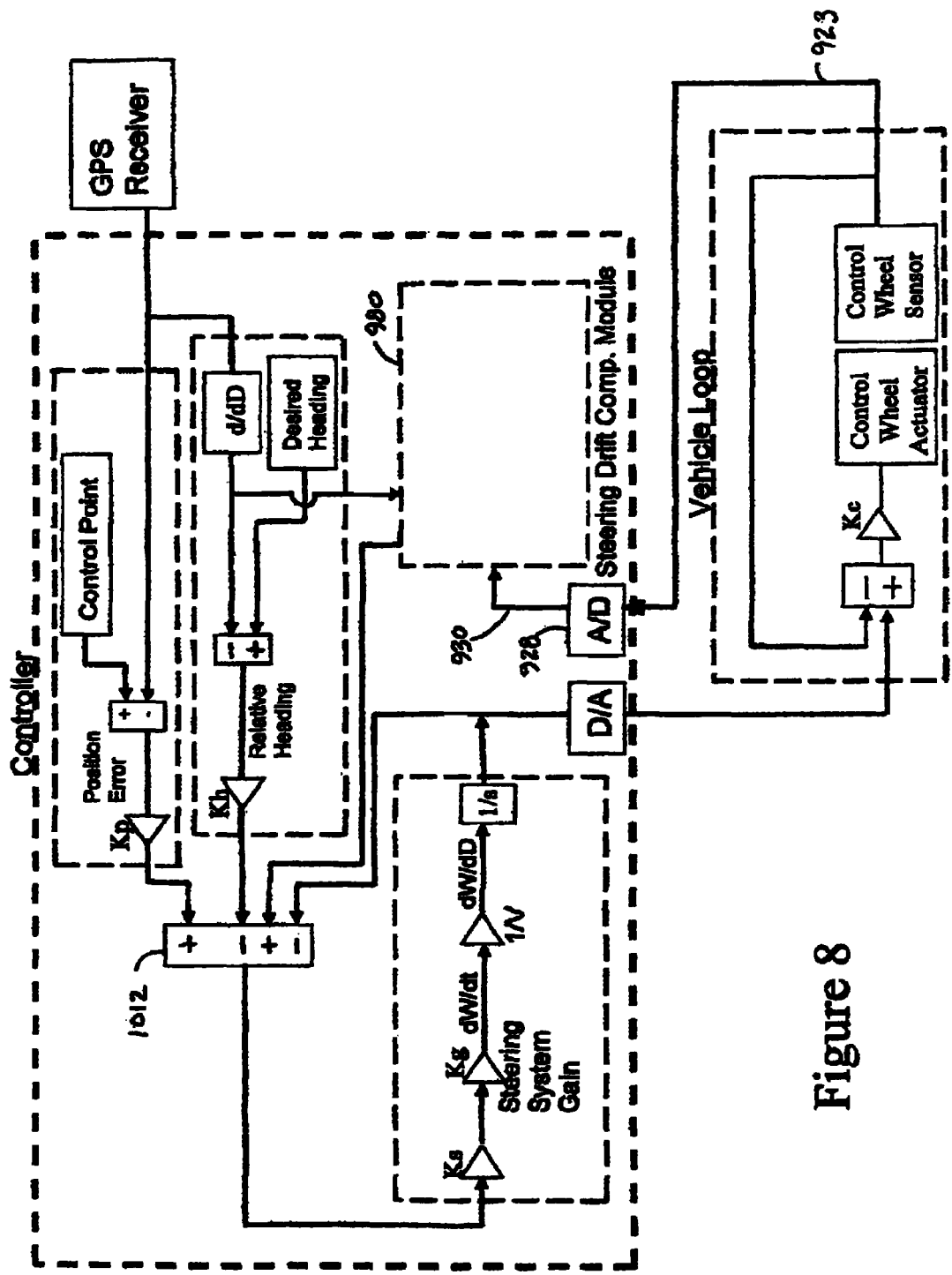
FIG. 8 also depicts an embodiment which manages valve non-linearities and noise

If the steering drift compensator is employed, then, as shown in FIG. 8, the output of the control wheel sensor, signal 923, can be used in an analogous way as signal 604 in FIG. 5 to generate signal 930 in FIG. 8. The sole purpose of signal 930 is for input into the steering drift compensator module 980.

The invention has been shown and described in an agricultural application. However, the invention should not be viewed as being limited by the disclosure. Rather, the metes and bounds of the invention should be understood with reference to the claims.

We claim:

1. A real-time path-directed controller for navigating an agricultural sprayer along a desired path across a field for agricultural applications, said controller comprising:
   (a) a position sensor, said position sensor obtaining position input information from global positioning system (GPS) telemetry, said position sensor producing an object position signal to an object position signal conditioning module, said object position signal conditioning module producing a conditioned object position signal to a controller summer;
   (b) a heading conditioning module, said heading conditioning module receiving the object position signal and conditioning the object position signal to produce a conditioned heading signal to the controller summer;
   (c) a control apparatus sensor, said control apparatus sensor producing a control apparatus signal to a control apparatus signal conditioning module, said control apparatus signal conditioning module producing a conditioned control apparatus signal to the controller summer;
   (d) a control apparatus null position conditioning module, said control apparatus null position conditioning module conditioning a distance-differentiated object position signal and conditioned control apparatus signal to produce a conditioned null position signal to the controller summer; and (e) a controller summer summing the conditioned object position signal, the conditioned heading signal, the conditioned control apparatus signal, and the conditioned null position signal to produce a controller summer signal to a controller summer conditioning module so as to produce a control apparatus control signal to a control apparatus controller so as to direct the control apparatus and thereby direct the object by feedback control along the desired path.

2. The controller of claim 1 wherein one or more of the control parameters governing the operation of said controller are mathematically determined in the distance domain.

3. The controller of claim 1 wherein poles associated with the controller are selected in accordance with a linear multiplicative-integrative object dynamic model.

4. The controller of claim 1 wherein the control parameters governing the operation of said controller are mathematically determined so as to effectuate under-damped control.

5. The controller of claim 1 wherein one or more of the control parameters governing the operation of said controller are dynamically updated.

6. The controller of claim 1 wherein the controller is configured to operate in a multi-mode manner of operation.

7. A real-time path-directed controller for navigating an agricultural sprayer along a desired path across a field for agricultural applications, said controller utilizing one or more control parameters mathematically determined in the distance domain in a multi-mode manner of operation, said controller comprising:

(a) a position sensor, said position sensor obtaining position input information from global positioning system (GPS) telemetry, said position sensor producing an object position signal to an object position signal conditioning module, said object position signal conditioning module producing a conditioned object position signal to a controller summer;

(b) a heading conditioning module, said heading conditioning module receiving the object position signal and conditioning the object position signal to produce a conditioned heading signal to the controller summer;

(c) a control apparatus sensor, said control apparatus sensor producing a control apparatus signal to a control apparatus signal conditioning module, said control apparatus signal conditioning module producing a conditioned control apparatus signal to the controller summer; and (d) a controller summer summing the conditioned object position signal, the conditioned heading signal, and the conditioned control apparatus signal to produce a controller summer signal to a controller summer conditioning module so as to produce a control apparatus control signal to a control apparatus controller so as to direct the control apparatus and thereby direct the object by feedback control along the desired path.

8. The controller of claim 7 wherein one or more of the control parameters governing the operation of said controller are dynamically updated.

* * * * *